United States Patent

Davies et al.

[11] 3,897,986
[45] Aug. 5, 1975

[54] BEARINGS

[75] Inventors: William J. Davies, Ambaston; Noel Harry Hooke, Etwall, both of England

[73] Assignee: Rolls-Royce (1971) Limited, London, England

[22] Filed: Nov. 19, 1973

[21] Appl. No.: 417,086

[30] Foreign Application Priority Data
Dec. 8, 1972   United Kingdom............... 56757/72

[52] U.S. Cl. ................................................ 308/183
[51] Int. Cl.² ........................................ F16C 19/00
[58] Field of Search ................................... 308/183

[56] References Cited
UNITED STATES PATENTS
2,318,990   5/1943   Doran ................... 308/183
2,611,532   9/1952   Ljungstrom ............ 308/183
3,278,110   10/1966  Heidorn ................. 308/183

Primary Examiner—M. Henson Wood, Jr.
Assistant Examiner—Richard A. Bertsch
Attorney, Agent, or Firm—Cushman, Darby & Cushman

[57] ABSTRACT

The invention concerns a double bearing arrangement, the bearings being separated from each other by means of a rotatable intermediate member, the intermediate member being rotated at a speed such that the overall speed of the bearing races and rolling elements is significantly reduced.

10 Claims, 4 Drawing Figures

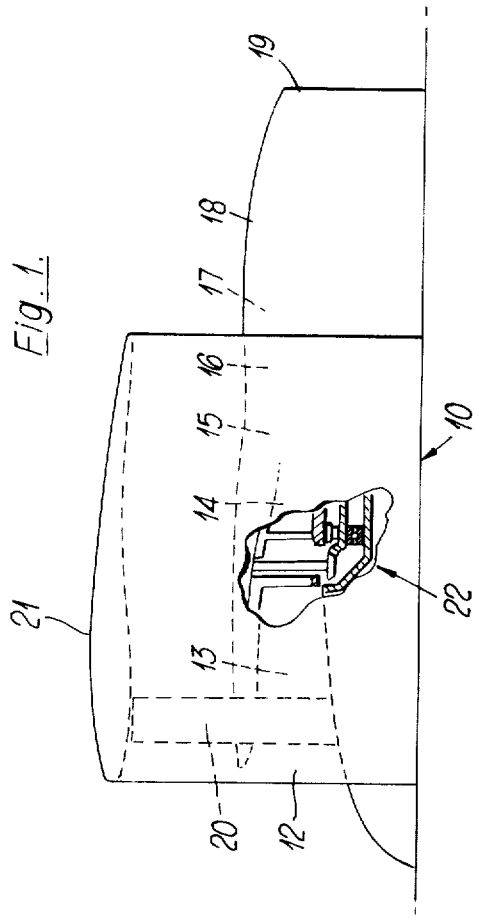

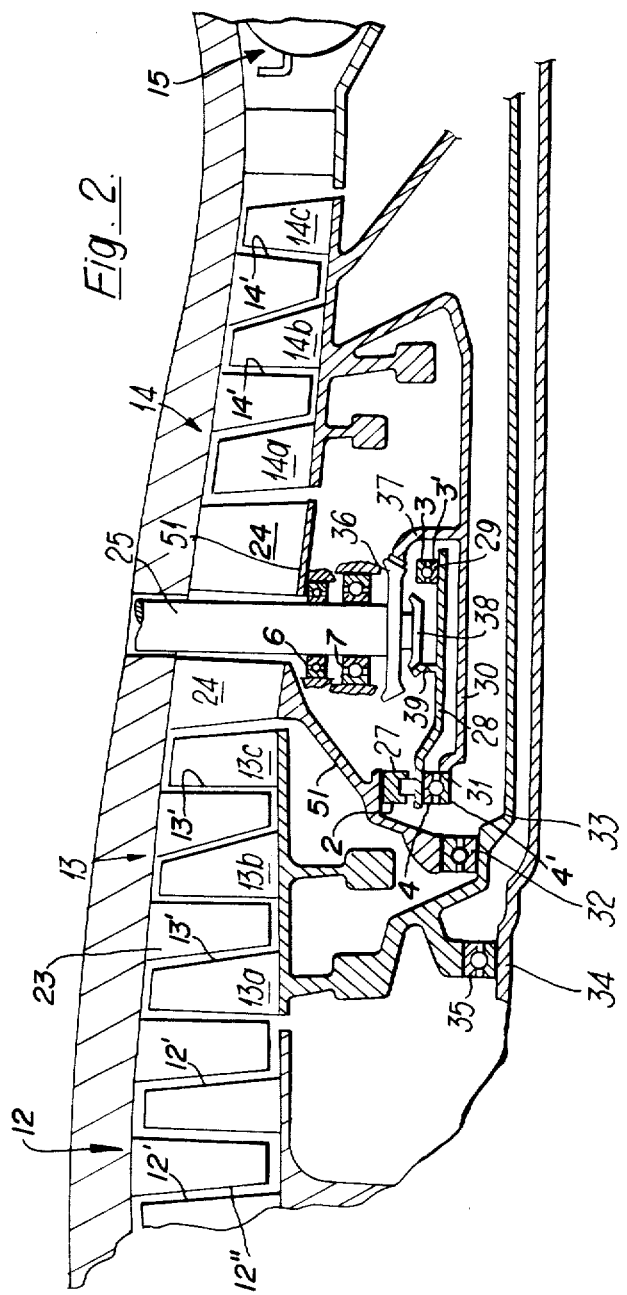

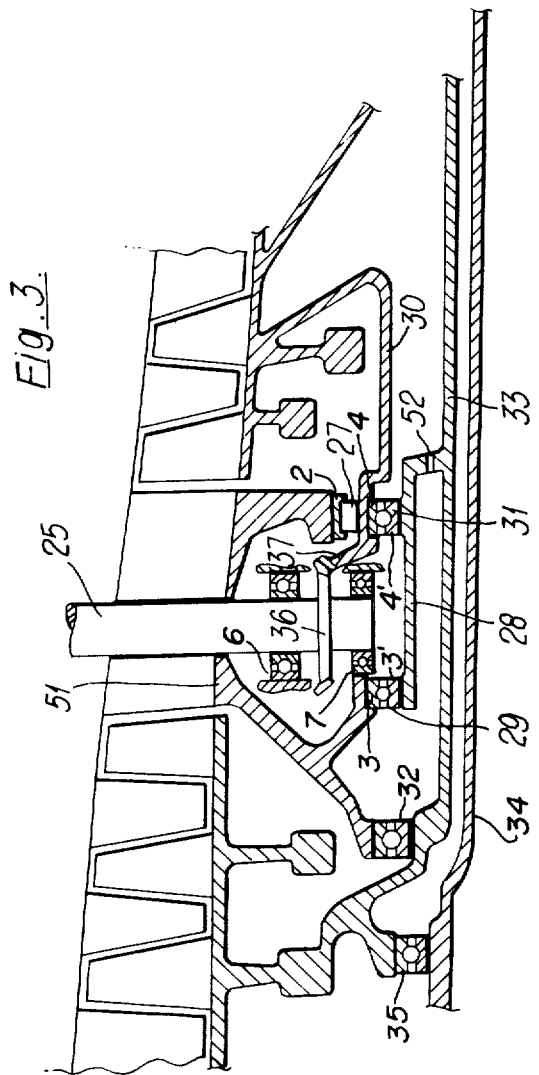

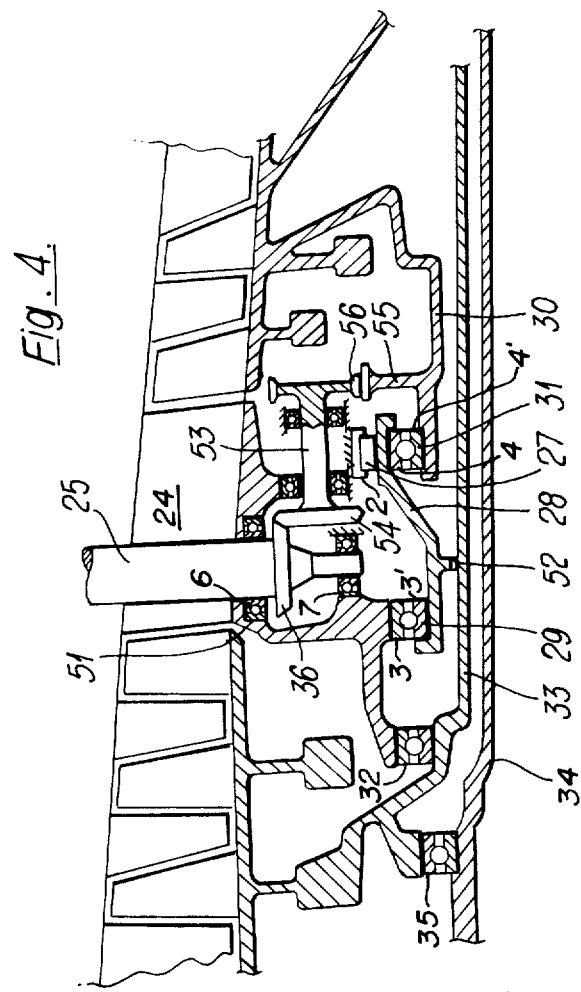

BEARINGS

This invention concerns a bearing arrangement and more particularly a bearing arrangement preferably but not exclusively suitable for use in both supporting and acting as a thrust bearing for a main shaft in a gas turbine engine.

In recent years the diameter and rotational speed of ball bearings required for mainshaft location has been increasing. One of the main factors limiting further increase in rotational speed has been the inability of a conventional bearing to carry any further increase in loading. The main problem is that under high speed conditions for example with a conventional ball bearing arrangement the ball inertia loading (i.e. ball centrifugal forces) tends towards a dominating magnitude which diminishes and finally eliminates the capacity of the bearing to carry axial loading.

An object of the present invention is to provide a bearing arrangement in which the ball inertia loading is significantly reduced.

According to the present invention a bearing arrangement for supporting a first member for relative rotation to a second member comprises two rolling element bearing assemblies and an intermediate member, one race of one of the bearing assemblies being attached to the first member, one race of the other of the bearing assemblies being attached to the second member, the other race of each of the bearing assemblies being attached to the intermediate member, and means whereby the intermediate member is rotated at a speed significantly lower than that of the higher speed bearing race and in the opposite sense thereto.

The two bearing assemblies are supported from static or rotating members by one of the said bearings and by an auxiliary bearing.

Preferably the intermediate member may be rotated by means of gearing.

Alternatively the intermediate member may be rotated directly by means of an engine shaft.

Preferably the intermediate member is further supported directly or indirectly by the said auxiliary bearing.

Preferably the auxiliary bearing comprises a roller bearing.

A bearing arrangement in accordance with one aspect of the invention in which the inner race of one bearing assembly and the outer race of the other bearing assembly is formed upon or attached to the common intermediate member.

Alternatively the outer races of both bearing assemblies are formed upon or attached to the common intermediate member.

According to a further aspect of the present invention the inner races of both bearing assemblies are formed upon or attached to the common intermediate member.

A bearing arrangement made in accordance with the present invention suitable for use in a gas turbine engine in which the arrangement provides support and acts as a thrust bearing within a gas turbine engine.

In this specification the term rolling elements is intended to include ball bearings, roller bearings, or needle roller type bearings.

The invention will be more particularly described by way of example only with reference to the accompanying drawings in which:

FIG. 1 shows a schematic drawing of a ducted fan gas turbine engine with a broken away casing portion showing an embodiment of the invention.

FIG. 2 shows an enlarged view in greater detail of the example shown at FIG. 1 in which the intermediate member is rotated by means of bevel gearing from the engine accessories drive shaft.

FIG. 3 shows a further embodiment of the invention in which the intermediate member is rotated directly by means of an upstream compressor shaft.

FIG. 4 shows a third embodiment of the invention in which the intermediate member is rotated directly by means of an upstream compressor shaft.

Referring to FIG. 1 a ducted fan gas turbine engine shown generally at 10 comprises, in flow series a low pressure compressor 12, an intermediate pressure compressor 13, a high pressure compressor 14, combustion equipment 15, high pressure turbine 16, an intermediate pressure turbine 17, a low pressure turbine 18 and an exhaust nozzle 19. Arranged radially outwardly of the main engine core is a fan 20 which rotates within a fan duct 21, a simple diagrammatic embodiment of the invention is shown in the broken away portion of the engine indicated generally by arrow 22.

FIG. 2 is a more detailed view of the broken away portion indicated at FIG. 1 by arrow 22 and in which there is shown a portion of the low pressure compressor 12, the intermediate pressure compressor 13 and, the high pressure compressor 14 and a portion of the compression equipment 15. Compressor 12 has the usual rotor blades 12' and stator blades 12'', whereas compressors 13 and 14 are provided with blades 13a, b, c, and 14 a, b, c, respectively the blades being arranged to rotate within an annular duct 23. Of course, the usual stator blades 13' and 14' are provided for the intermediate compressor 13 and the high pressure compressor 14, respectively. An annular array of structural aerofoil shaped struts 24 are arranged between the intermediate pressure compressor 13 and the high pressure compressor 14 through one of which is carried the engine accessories drive shaft 25. The struts 24 are arranged to carry an inner casing 51 which constitutes the first member and fixed structure within the engine and in turn carries supporting bearings 6 and 7 for the accessories drive shaft 25 and also the outer races 2 and 3 of the supporting bearings 27 and 29, respectively, the supporting bearing comprising a roller type bearing serving to support the intermediate member 28 at its most upstream end. The intermediate member is provided with further support at its downstream end by means of the ball supporting bearing 29. The HP compressor shaft 30 which constitutes the second member is supported at its upstream end by means of ball supporting bearing 31 which is disposed between the shaft 30 and the intermediate member 28. The inner casing 51 carries a further bearing shown at 32 which serves to support the intermediate compressor shaft 33. Disposed concentrically within the intermediate compressor shaft 33 is arranged the low pressure compressor shaft 34 for the low pressure compressor 12 which is supported at its downstream end from the intermediate pressure compressor shaft 33 by means of bearing 35.

The supporting bearings 27, 29, and 31, as well as other bearings described and disclosed in the drawings, included two bearing races having a circumferentially extending array of rolling elements interposed therebetween. In some instances, the rolling elements are balls, whereas, in other instances, they are rollers.

The accessories drive shaft 25 is further provided with a bevel gear 36 which meshes with a bevel gear 37 arranged upon the upstream end of the high pressure compressor shaft 30. A further bevel gear 38 is provided upon the accessories drive shaft 25 which in turn meshes with a bevel gear 39 provided upon the intermediate member 28.

In operation drive is transmitted from the high pressure compressor shaft 30 which constitutes the second member via bevel gears 37 and 36 to the accessories drive shaft 25, this in turn transmits drive through bevel gears 38,39 to the intermediate member 28. It will be appreciated that by suitable choice of gearing the outer race 4 of the bearing 31 will be constrained by means of the gearing such as to revolve at a speed significantly less than the inner race 4' of bearing 31 as determined by the R.P.M. of the high pressure compressor shaft 30 and in the opposite sense thereto.

It will thus be appreciated that by use of a double bearing arrangement and a common intermediate member as opposed to a conventional single bearing arrangement the cage speeds of a double bearing system can be significantly reduced thereby reducing the ball centrifugal force, and thus permitting a higher operating R.P.M.

FIG. 3 shows a further embodiment of the invention in which the bearing assembly containing bearings 27 and 31 of FIG. 2 are positioned downstream of the accessories drive shaft 25. The bearing 27 serves to support the relatively high speed high pressure compressor shaft 30 which constitutes the second member which in turn supports bearing 31, the bearing 31 serving to support intermediate member 28 at its most downstream end. The intermediate member 28 is further supported at its upstream end by means of ball bearing 29 whose radially outer race 3 is supported from static casing 51 which constitutes the first member. Drive is transmitted to the intermediate member 28 through splines 52 on the intermediate compressor shaft 33.

The accessories drive shaft 25 is provided with bevel gear 36 which meshes with bevel gear 37 which is arranged upon the upstream end of the high pressure compressor shaft 30.

As the intermediate compressor shaft 33 revolves at a speed significantly less than the R.P.M. of the high pressure compressor shaft 30 and in the opposite sense thereto, the overall cage speed outer races 3 and 4 and inner races 3' and 4' of bearings 29 and 31, respectively may be considerably lower than those encountered in a single bearing arrangement.

FIG. 4 shows an alternative embodiment with bearings 27 and 31 as FIG. 3. However, in this embodiment bearing 27 serves to support the intermediate member 28 at its most downstream end which is further supported at its upstream end by means of ball bearing 29 whose radially outer race is supported from static casing 51 which constitutes the first member. The high pressure compressor shaft 30 which constitutes the second member is supported at its upstream end by means of ball bearing 31 which is disposed between the shaft 30 and the intermediate member 28.

Drive to the accessories drive shaft 25 is taken from the high pressure compressor shaft 30 via spur gears 55 and 56, and bevel gears 54 and 36, the gears 56 and 54 being supported from layshaft 53. In this example intermediate member 28 is driven from the intermediate pressure compressor shaft 33 by splines 52 in a similar manner to the splines 52 shown in FIG. 3.

We claim:

1. A bearing arrangement for supporting a first member for relative rotation to a second member comprising two rolling element bearing assemblies, each rolling element bearing assembly comprising two bearing races having a circumferentially extending array of rolling elements interposed therebetween, and an intermediate member, means attaching one race of one said bearing assembly to said first member, and means attaching one race of the other said bearing assembly to said second member, and means attaching the other race of each said bearing assembly to said intermediate member, and means whereby the intermediate member is rotated at a speed significantly lower than that of the speed of at least one of said first member ans said second member and in an opposite sense thereto.

2. A bearing arrangement as claimed in claim 1 in which said first member is a static means and said second member is a rotating means, and in which the two said bearing assemblies are supported from at least one of said static means and said rotating means by one of the said bearing assemblies and by an auxiliary bearing assembly.

3. A bearing arrangement as claimed in claim 2 in which said intermediate member is partially supported operatively by said auxiliary bearing assembly.

4. A bearing arrangement as claimed in claim 2 in which said auxiliary bearing assembly comprises a roller bearing.

5. A bearing arrangement as claimed in claim 1 in which said intermediate member is rotated by gearing.

6. A bearing arrangement as claimed in claim 1 in which said intermediate member is rotated by means of an engine shaft.

7. A bearing arrangement as claimed in claim 1 in which the inner race of one said bearing assembly and the outer race of the other said bearing assembly is operatively attached to said intermediate member.

8. A bearing arrangement as claimed in claim 1 in which the outer races of both said bearing assemblies are operatively attached to the intermediate member.

9. A bearing arrangement as claimed in claim 1 in which the inner races of both said bearing assemblies are operatively attached to the intermediate member.

10. A bearing arrangement as claimed in claim 1 in which the bearing arrangement provides support and acts as a thrust bearing for a main shaft of a gas turbine engine.

* * * * *